United States Patent
Mueller et al.

(10) Patent No.: US 12,110,063 B2
(45) Date of Patent: Oct. 8, 2024

(54) HYBRID COMPONENT AND METHOD FOR MANUFACTURING A HYBRID COMPONENT

(71) Applicant: Bayerische Motoren Werke Aktiengesellschaft, Munich (DE)

(72) Inventors: Patrick Mueller, Villa de Reyes (MX); Dominik Paulke, Munich (DE); Christof Schoenhammer, Laberweinting (DE); Jean-Marc Segaud, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 782 days.

(21) Appl. No.: 17/267,167

(22) PCT Filed: Jul. 11, 2019

(86) PCT No.: PCT/EP2019/068648
§ 371 (c)(1),
(2) Date: Feb. 9, 2021

(87) PCT Pub. No.: WO2020/030375
PCT Pub. Date: Feb. 13, 2020

(65) Prior Publication Data
US 2021/0309304 A1 Oct. 7, 2021

(30) Foreign Application Priority Data

Aug. 10, 2018 (DE) ............ 10 2018 213 487.1

(51) Int. Cl.
*B62D 27/02* (2006.01)
*B29C 45/00* (2006.01)
(Continued)

(52) U.S. Cl.
CPC .......... *B62D 27/02* (2013.01); *B29C 45/0055* (2013.01); *B29C 45/14819* (2013.01);
(Continued)

(58) Field of Classification Search
CPC .............................. B62D 29/004; B32B 3/266
See application file for complete search history.

(56) References Cited

U.S. PATENT DOCUMENTS

2010/0098969 A1 4/2010 Hashimura et al.
2012/0274099 A1 11/2012 Tamura
(Continued)

FOREIGN PATENT DOCUMENTS

CN 103476608 A 12/2013
CN 105473312 A 4/2016
(Continued)

OTHER PUBLICATIONS

Chinese-language Office Action issued in Chinese Application No. 201980040470.1 dated Jun. 1, 2022 with English translation (19 pages).
(Continued)

*Primary Examiner* — William P Watkins, III
(74) *Attorney, Agent, or Firm* — Crowell & Moring LLP

(57) ABSTRACT

A hybrid component has at least two component portions, which are connected via at least one connection portion. The at least one connection portion extends in a joining direction. A first component portion is formed from a first material which has a first modulus of elasticity, and a second component portion is formed from a second material which has a second modulus of elasticity different from the first modulus of elasticity. The at least one connection portion is designed at least to compensate for a sudden change in rigidity between the two component portions. The at least one connection portion has a rigidity that increases in the joining direction and in the direction of the component portion with the higher modulus of elasticity.

16 Claims, 1 Drawing Sheet

(51) Int. Cl.
  B29C 45/14 (2006.01)
  B62D 29/00 (2006.01)
  *B29K 705/02* (2006.01)
  *B29K 705/12* (2006.01)
  *B29L 31/30* (2006.01)

(52) U.S. Cl.
  CPC .... *B62D 29/004* (2013.01); *B29C 2045/0058* (2013.01); *B29K 2705/02* (2013.01); *B29K 2705/12* (2013.01); *B29L 2031/30* (2013.01)

(56) References Cited

U.S. PATENT DOCUMENTS

| | | |
|---|---|---|
| 2012/0299334 A1 | 11/2012 | Takayama et al. |
| 2014/0232081 A1 | 8/2014 | Gleason et al. |
| 2014/0328614 A1 | 11/2014 | Fleischheuer et al. |
| 2016/0200369 A1 | 7/2016 | Ruess et al. |
| 2016/0229466 A1 | 8/2016 | Schnaufer et al. |

FOREIGN PATENT DOCUMENTS

| | | |
|---|---|---|
| CN | 105774919 A | 7/2016 |
| DE | 10 2004 010 762 A1 | 9/2005 |
| DE | 10 2006 043 852 A1 | 5/2007 |
| DE | 10 2015 100 263 B3 | 3/2016 |
| EP | 1 571 070 A2 | 9/2005 |
| WO | WO 2013/034323 A1 | 3/2013 |

OTHER PUBLICATIONS

International Search Report (PCT/ISA/210) issued in PCT Application No. PCT/EP2019/068648 dated Nov. 7, 2019 with English translation (four (4) pages).

German-language Written Opinion (PCT/ISA/237) issued in PCT Application No. PCT/EP2019/068648 dated Nov. 7, 2019 (six (6) pages).

German-language Search Report issued in German Application No. 10 2018 213 487.1 dated May 14, 2019 with partial English translation (13 pages).

HYBRID COMPONENT AND METHOD FOR MANUFACTURING A HYBRID COMPONENT

BACKGROUND AND SUMMARY OF THE INVENTION

The present invention relates to a hybrid or composite component, and to a method for manufacturing a hybrid or composite component.

Hybrid or composite components of the type in question are constituent elements and/or components which comprise several different materials. This is necessary, for example, to meet specific stiffness or strength requirements and/or to (at the same time) achieve targets in terms of weight etc.

In this context, DE 10 2004 010 762 A1 discloses for example a composite component which comprises a sheet-metal structure and a light-metal structure which is at least partially cast onto the former, wherein apertures are introduced in the sheet-metal structure in an encapsulating region and the sheet-metal structure, at least in the encapsulating region, is provided with a coating which has an electrically insulating action. The sheet-metal structure is in particular a steel sheet, an aluminum sheet or a magnesium sheet.

What is disadvantageous in the case of material connections of this type is that, on account of the different moduli of elasticity of the substances used at the transition points and/or the connection regions of the different substances, jumps in stiffness occur which entail disadvantages with respect to durability in particular in the case of dynamic loading. The result may be a premature failure of components of this type.

It is therefore an object of the present invention to provide a hybrid component and also a method for manufacturing a hybrid component which further develop the known components and methods, have high stabilities and can be produced quickly.

This object is achieved by a hybrid component and also by a method according to the independent claims. Further advantages and features become apparent from the dependent claims, the description and the appended figures.

According to the invention, a hybrid component comprises at least two component portions which are connected by way of at least one connecting portion, wherein the at least one connecting portion extends in a joining direction, wherein a first component portion is formed or manufactured from a first material which has a first modulus of elasticity, and wherein a second component portion is formed or manufactured from a second material which has a second modulus of elasticity different than the first modulus of elasticity. The at least one connecting portion is configured to at least compensate for a jump in stiffness between the component portions, in that the at least one connecting portion has a stiffness which increases in the joining direction and toward the component portion with the higher modulus of elasticity.

According to a preferred embodiment, the hybrid component and/or the composite component is a component or a constituent element for an automobile, such as for example a passenger vehicle, a commercial vehicle or even a motorcycle. In particular, the (hybrid) component can be a frame component or structural component.

It is advantageous if the at least one connecting portion is shaped and/or configured such that the jump in stiffness between the different substances and/or materials of the component portions runs smoothly or as smoothly as possible, in other words i.e., as far as possible, a jump in stiffness does not occur. This is achieved in that, in the joining direction, the connecting portion has a stiffness which increases toward the material with the higher modulus of elasticity and/or toward the stiffer component portion. As a result, a graded transition is formed, which forms a hybrid transition zone or transition structure in which the stiffnesses and/or moduli of elasticity of the two component portions should and/or can be matched over a defined distance.

According to one embodiment, the first material corresponds to a first substance and the second material corresponds to a second substance. As an alternative, the first and/or the second material can also however be a mixture of substances in each case, wherein the mixture then has a corresponding modulus of elasticity. The respective modulus of elasticity can be calculated in accordance with the formula specified further below.

The connecting portion is expediently enclosed or encapsulated in the first or in the second component portion, and/or is embedded in the respective portion.

According to a preferred embodiment, the at least one connecting portion is encapsulated, for example in a low-pressure casting operation, a die-casting operation or, when plastics are being used, for example also in an injection-molding operation.

It is preferred if the at least one connecting portion is formed or provided by a (separate) insert element or by one of the component portions. According to one embodiment, two component portions are thus directly connected or indirectly, specifically by means of the insert element or optionally also several insert elements. There is thus an advantageously correspondingly wide variety of manufacturing options. The component portions for their part can likewise be manufactured in many ways. According to one embodiment, the first component portion or the second component portion is also a shaped part. According to one embodiment, the insert element is a cast part, e.g. a die-cast part. According to one embodiment, the insert element is a metal sheet, for example a steel or aluminum sheet.

According to one embodiment, the at least one connecting portion has a perforation or a hole pattern which is formed such that a stiffness of the connecting portion increases or decreases in the joining direction. According to one embodiment, the connecting portion has or is in the form of a pore structure or sponge structure. The pore structure or sponge structure can be in the form of a layer or encapsulation. According to one embodiment, the connecting portion is also however as such in the form of a pore structure or sponge structure at least in certain regions. According to one embodiment, a structure of this type is advantageously additively manufactured.

The joining direction extends from the first component portion to the second component portion, or vice versa. Here, the expression "direction" is not to be understood as a straight line or the like. The "direction" can e.g. also run in an arc, i.e. it depends on the configuration of the connecting portion. In this case, however, the joining direction lies in a connection plane and not transversely or perpendicularly thereto. In this context, it should also be mentioned that the form of the at least one connecting portion as such depends on the geometry of the hybrid component or of the composite component as such. Correspondingly, the at least one connecting portion can be in the form of a simple web or a tab, but optionally can also have a, for example, three-dimensional (complicated) shape.

The perforation and/or the hole pattern stated above or else the pore structure or sponge structure advantageously make it possible to weaken or reduce the stiffness of the respective connecting portion in a targeted manner and thus to set or configure it in a targeted manner, in order to adapt it to the stiffnesses and/or the moduli of elasticity of the adjacent materials.

According to one embodiment, the perforation or the hole pattern has holes and/or recesses which have a different size, density, distribution and/or orientation in the joining direction. According to one embodiment, the holes and/or recesses become smaller and/or fewer in number toward the component portion with the higher modulus of elasticity, for example a porosity decreases. In addition or as an alternative, a wall thickness of the connecting portion is also set or selected such that it increases toward the component portion with the higher modulus of elasticity, as a result of which the stiffness can likewise be adapted. If an insert element is used, how high the modulus of elasticity of the material of the insert element is should always be taken into consideration.

The connecting portion is preferably shaped such that the modulus of elasticity in the joining direction is degraded or decreases somewhat linearly and is built up or increases again, wherein here increases of between 0.5 to 1.5 have proven to be advantageous, an increase of 1.05 or approximately 1.05 having proven to be particularly advantageous (the values stated above relate to the magnitudes of the increases). The modulus of elasticity E, stated above, in the region of the connecting portion is calculated here as follows:

$$E = E_{10} * V_{10} + E_{20} * (1 - V_{20}),$$

in which $E_{10}$ denotes the modulus of elasticity of a material of the connecting portion, $V_{10}$ denotes the volume fraction of the material of the connecting portion, $E_{20}$ denotes the modulus of elasticity of the material of the first component portion or of the second component portion, and $V_{20}$ denotes the volume fraction of the material of the first component portion or of the second component portion in the corresponding region. A homogenous mixing of the substances is assumed here.

The insert element preferably comprises two connecting portions. As an alternative, the insert element can however also have only one connecting portion.

A free portion is preferably provided between the connecting portions. The two connecting portions are thus spaced apart from one another. In other words, formed or created between the two materials and/or between the two component portions is a spacing or gap which is advantageous in particular for the manufacture of the hybrid component, since the materials of the two component portions are not in direct contact. The insert element can be encapsulated in the first substance, for example in a die-casting operation, in order then to be encapsulated in the second substance a short time thereafter. Direct encapsulation of the first material would possibly still not be possible at all on account of its temperature.

According to one embodiment, the free portion has holes and/or recesses. This may be necessary if the insert element as such were too stiff. The stiffness is also expediently adapted in a targeted manner in the free portion.

According to one embodiment, a substance of the insert element has a modulus of elasticity which is between the modulus of elasticity of the first material and the modulus of elasticity of the second material. Solely as a result of this is it possible to at least reduce a jump in stiffness between the two component portions. In particular in combination with a suitably formed perforation or a correspondingly structured hole pattern etc. can the transition optionally be still further optimized. According to one embodiment, the insert element is also formed from the first material or from the second material.

According to one embodiment, the first substance is a metal and the second substance is a nonmetal. According to one embodiment, the metal is in particular a light metal, such as magnesium and/or aluminum. The nonmetal may be a plastic. As an alternative, the first substance may however also be a nonmetal and/or the second substance may also be a metal.

The invention is also directed to a method for manufacturing a hybrid component, comprising the following steps: providing an element of a first material; encapsulating the element, at least in certain regions, in a second material along a connecting portion, wherein the connecting portion extends in a joining direction, and wherein the first material has a modulus of elasticity different than the second material; and shaping the connecting portion such that its stiffness increases in the joining direction and toward the material with the higher modulus of elasticity.

According to one embodiment, the element, which also corresponds to the first component portion stated above, is manufactured in a die-casting operation, in particular in an aluminum die-casting operation. A perforation or a hole pattern is advantageously introduced into the first component portion by way of the corresponding tool. This can take place, for example, directly in the die-casting mold by a punching or cutting operation by way of a corresponding device and/or also can be performed in an additional step after the cast part has been removed. As an alternative, an insert element is inserted into the casting tool, in particular into the die-casting tool, and protrudes in the form of a join from the component, in particular i.e. the first component portion.

According to one embodiment, the pore structure or sponge structure stated above is manufactured by means of an additive manufacturing method. According to one embodiment, the connecting portion as such is additively manufactured. According to one embodiment, the insert element is additively manufactured.

According to one embodiment, the method comprises the following step: shaping the connecting portion by machining.

A perforation or a hole pattern is expediently manufactured for example by a punching or cutting method. As an alternative, the perforation or the hole pattern can also be manufactured and/or molded directly in the casting operation.

According to one embodiment, the method comprises the following step: encapsulating in the second material in an injection-molding operation.

Here, the second material is in particular a plastic. According to one embodiment, the second component portion is manufactured from a plastic substance. The at least one connecting portion makes a permanent connection of the very wide variety of substances possible.

The connecting portion makes possible a graded substance transition for the purpose of realizing a fluid transition of the different substance properties in the mixing region. In particular the use of the insert element stated above makes it possible to prepare the two processes in one installation and/or in one tool by thermal separation. At the typical removal temperature of the metallic constituent element (e.g. in a die-casting operation), a directly molded-on plastic constituent element would become damaged. In order not to increase the cycle time owing to otherwise necessary cooling-down times, the thermal separation is ensured by the additional insert element, as a result of which the or a plastic constituent element can be molded on without coming into direct contact with the still-hot metallic constituent part. Consequently, the component and investment costs are reduced.

In particular, the method for manufacturing a hybrid component from two component portions is a method for manufacturing the hybrid component according to the invention. The advantages and features mentioned in conjunction with the hybrid component apply analogously and correspondingly for the method, and vice versa.

Further advantages and features become apparent from the description below of embodiments of hybrid components with reference to the appended figures.

DETAILED DESCRIPTION OF THE DRAWINGS

Figure 1:
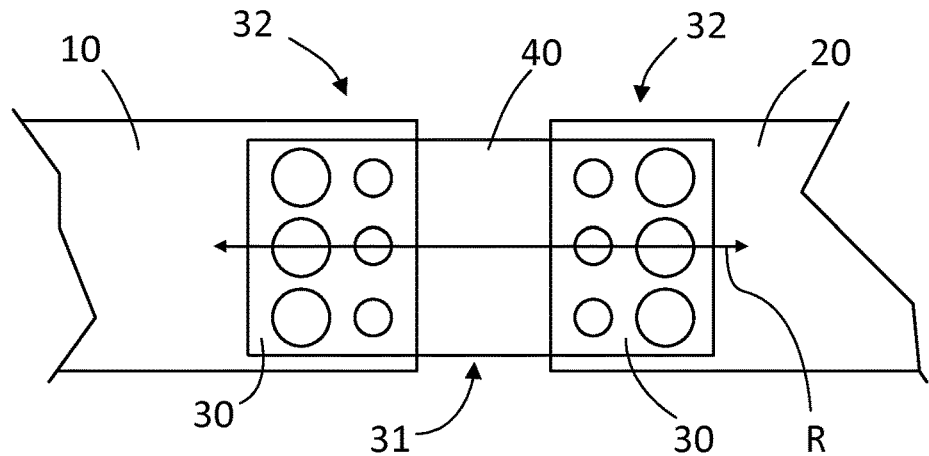
FIG. 1 is a schematic view of an embodiment of a hybrid component with an insert element.

FIG. 1 shows a schematic view of one embodiment of a hybrid component, comprising a first component portion 10 and a second component portion 20 which are connected in a joining direction R by way of an insert element 40. The insert element 40 comprises or forms two connecting portions 30 which, in the embodiment shown here, have a hole pattern and/or a perforation 32, the geometry of which is selected such that a stiffness of the insert element 40 decreases both toward the second component portion 20 and toward the first component portion 10. The insert element 40 is formed from a material the modulus of elasticity of which is above the modulus of elasticity of the first component portion 10 and the modulus of elasticity of the second component portion 20. Consequently, a graded substance transition can be made possible and/or a fluid transition of the substance properties in the mixing region and/or in the region of the connecting portions 30 can be achieved at least in certain regions.

The insert element 40 comprises two connecting portions 30. Formed between the connecting portions 30 is a free portion 31 (represented with an excessive size), which makes possible a kind of thermal decoupling or separation between the first component portion 10 and the second component portion 20. This makes, inter alia, a short manufacturing process possible, since e.g. a second component portion 20 of plastic can already be molded on when a first component portion 10 of metal, which has already been cast, possibly has temperatures which are still too high. In order to achieve a uniform increasing and/or decreasing stiffness progression over the entire length of the insert element 40, a modulus of elasticity of the insert element 40 can be correspondingly selected and/or the free portion 31 can be provided with holes and/or recesses for the purpose of targeted weakening.

Figure 2:
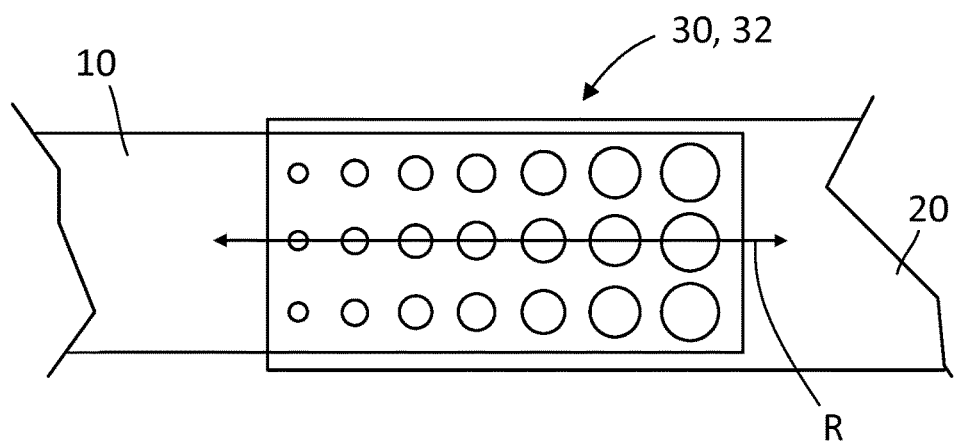
FIG. 2 is a schematic view of an embodiment of a hybrid component, wherein a connecting portion is formed by one of the component portions.

FIG. 2 shows substantially the configuration, known from FIG. 1, of a hybrid component, comprising a first component portion 10 and a second component portion 20. In the embodiment illustrated here, however, a connecting portion 30, comprising a perforation and/or a hole pattern 32, is produced directly by the first component portion 10.

Figure 3:
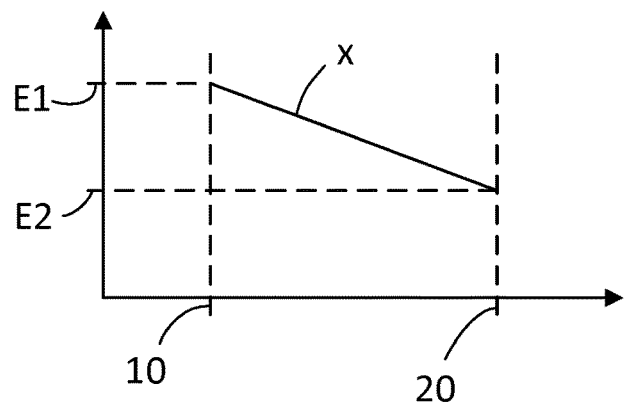
FIG. 3 is a diagram showing a progression of the modulus of elasticity over a connecting portion.

Finally, FIG. 3 shows a schematic progression of a modulus of elasticity over a connecting portion between a first component 10, which is manufactured from a material/substance having a modulus of elasticity E1, and a second component portion 20, which is manufactured from a material/substance having a modulus of elasticity E2. The modulus of elasticity E1 is higher than the modulus of elasticity E2. By virtue of a correspondingly formed connecting portion, cf. for example FIGS. 1 and 2, however, a progression x of a modulus of elasticity can be achieved in the region of the connecting portion that makes a smooth transition between the first component portion 10 and the second component portion 20 possible. If the drop in the modulus of elasticity from the first component portion 10 to the second component portion 20 over the transition zone and/or the connecting portion is evaluated, increases of between 0.5 and 1, in particular in a range of approximately 1.05, have proven to be expedient depending on the pairing of substances. In the outline illustrated here, the increase has a negative value.

LIST OF REFERENCE SIGNS

10 First component portion, element
20 Second component portion
30 Connecting portion
31 Free portion, gap
32 Hole pattern, perforation
40 Insert element
E1 Modulus of elasticity of the first substance
E2 Modulus of elasticity of the second substance
X Progression of the modulus of elasticity
R Joining direction

What is claimed is:

1. A hybrid component, comprising:
    at least first and second component portions, the first component portion being formed from a first material which has a first modulus of elasticity, and the second component portion being formed from a second material which has a second modulus of elasticity different than the first modulus of elasticity;
    at least one connecting portion by which the first and second portions are connected, the at least one connecting portion extending in a joining direction, wherein the at least one connecting portion is formed either as an insert element, or from one of the first and second component portions;
    wherein the at least one connecting portion is configured to compensate for a jump in stiffness between the first and second component portions, the at least one connecting portion having a variable perforation or hole pattern extending in the joining direction to create a stiffness which gradually increases in the joining direction, toward the component portion with the higher modulus of elasticity; and,
    wherein a modulus of elasticity in the connecting portion gradually increases in the joining direction, toward the component portion with the higher modulus of elasticity, the increase in the modulus of elasticity, or the slope, being between 0.5 to 1.5.

2. The hybrid component according to claim 1, wherein the modulus of elasticity increases linearly in the joining direction, toward the component portion with the higher modulus of elasticity.

3. The hybrid component according to claim 1, wherein the variable perforation or hole pattern has holes and/or recesses which have a different size, density, distribution and/or orientation extending in the joining direction.

4. The hybrid component according to claim 1, wherein the insert element comprises two connecting portions.

5. The hybrid component according to claim 4, wherein a free portion is provided between the two connecting portions of the insert element.

6. The hybrid component according to claim 5, wherein the free portion has a pattern of holes and/or recesses extending in the joining direction.

7. The hybrid component according to claim 1, wherein a material of the insert element has a modulus of elasticity which is between the modulus of elasticity of the first material and the modulus of elasticity of the second material.

8. The hybrid component according to claim 1, wherein the first material is a metal and the second material is a nonmetal.

9. A method for manufacturing a hybrid component, comprising the steps of:
providing an element of a first material;
encapsulating the element, at least in certain regions, in a second material along a connecting portion, wherein the connecting portion extends along a joining direction and is formed from one of the first and second materials, wherein the first material has a modulus of elasticity different than the second material;
shaping the connecting portion with a variable perforation or hole pattern extending in the joining direction such that its stiffness gradually increases in the joining direction, toward the material with the higher modulus of elasticity; and,
wherein a modulus of elasticity in the connecting portion gradually increases in the joining direction, toward the component portion with the higher modulus of elasticity, the increase in the modulus of elasticity, or the slope, being between 0.5 to 1.5.

10. The method according to claim 9, further comprising the step of:
shaping the connecting portion by machining.

11. The method according to claim 9, wherein the second material is a plastic, and further comprising the step of:
encapsulating the element in the second material in an injection-molding operation.

12. The method according to claim 9, wherein
the connecting portion is shaped with the variable perforation or hole pattern in the joining direction such that the modulus of elasticity generally increases linearly in the joining direction, toward the material with the higher modulus of elasticity.

13. The method according to claim 12, wherein
the connecting portion is shaped with the variable perforation or hole pattern such that holes and/or recesses have a different size, density, distribution and/or orientation extending in the joining direction.

14. The hybrid component according to claim 1, wherein the variable perforation or hole pattern has holes and/or recesses which have a different size, density, distribution and/or orientation extending in the joining direction.

15. The hybrid component according to claim 1, wherein the variable perforation or hole pattern comprises at least three perforations or holes extending in the joining direction.

16. The method according to claim 9, wherein the variable perforation or hole pattern comprises at least three perforations or holes extending in the joining direction.

* * * * *